H. W. BROWN.
TIME RECORDER.
APPLICATION FILED OCT. 1, 1910.
1,078,124.
Patented Nov. 11, 1913.
2 SHEETS—SHEET 1.
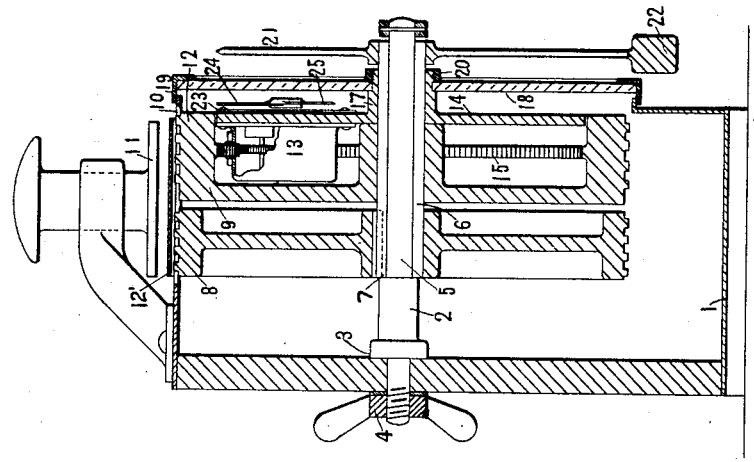
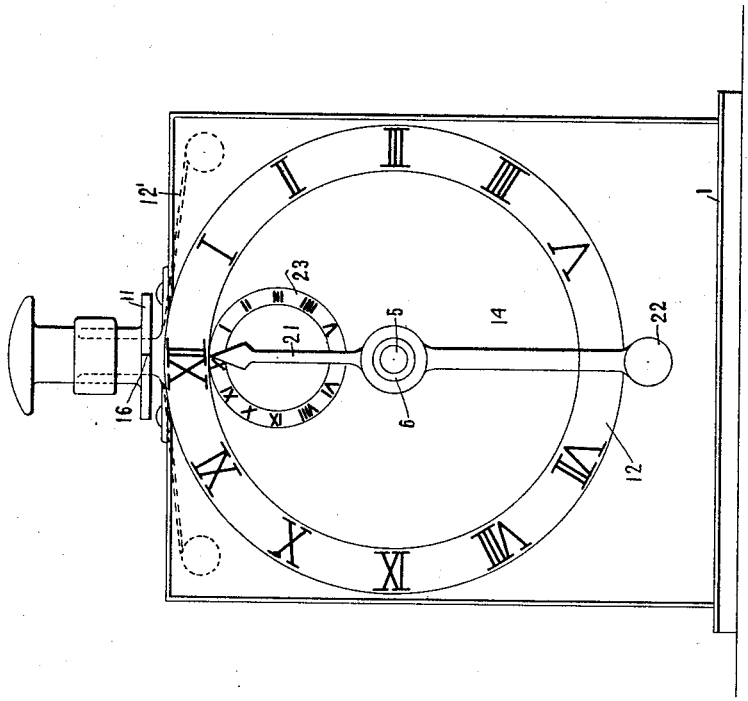

H. W. BROWN.
TIME RECORDER.
APPLICATION FILED OCT. 1, 1910.
1,078,124.
Patented Nov. 11, 1913.
2 SHEETS—SHEET 2.
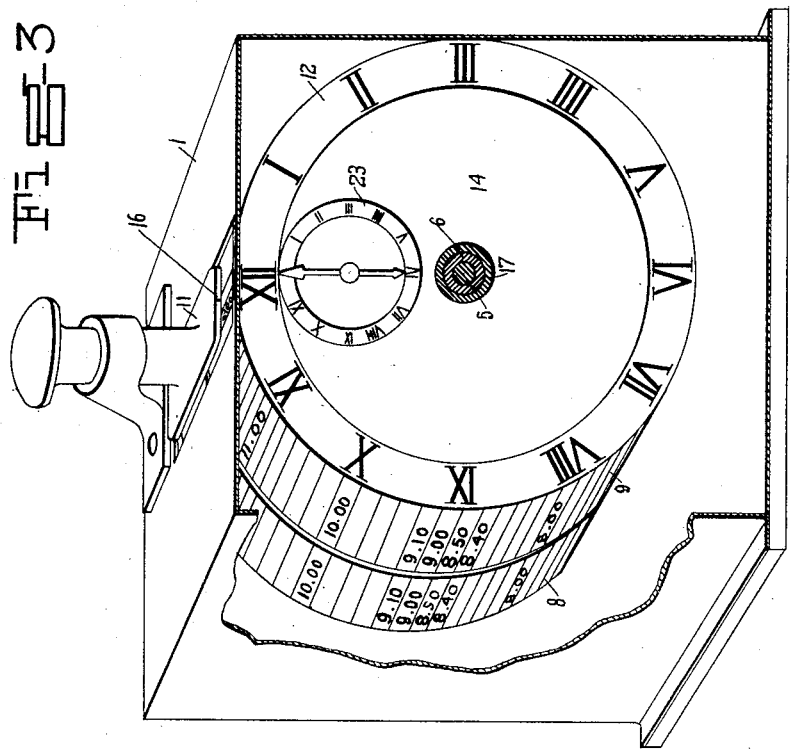

UNITED STATES PATENT OFFICE.

HENRY W. BROWN, OF WESTPORT, CONNECTICUT.

TIME-RECORDER.

1,078,124.  Specification of Letters Patent.  Patented Nov. 11, 1913.

Application filed October 1, 1910. Serial No. 584,933.

*To all whom it may concern:*

Be it known that I, HENRY W. BROWN, a citizen of the United States, residing at Westport, in the county of Fairfield and State of Connecticut, have invented certain new and useful Improvements in Time-Recorders, of which the following is a full, clear, and exact description, such as will enable others skilled in the art to which it appertains to make and use the same.

This invention relates to instruments for the measurement of time, quantity, value, etc., and particularly to recorders for measuring and indicating elapsed time.

One of the objects of the invention is to provide an efficient means for indicating the difference between two of a uniformly traveling series of consecutive numbers representing time, quantity, value, etc., as may be desired.

Another object of the invention is the provision of efficient mechanism adapted to indicate either visually or by printed or other record the elapsed time between different times of day, or time instants.

Another object of the invention is to provide simple mechanism adapted to indicate or print the time of day at different times, and the interval of time between the different times.

Other objects will be in part obvious and in part pointed out hereinafter.

While this invention is capable of extensive use, it is more especially to be employed as a workmen's time recorder and calculator for recording the beginning and the completion of a work, together with the time interval between. But though the described embodiment of the invention is such as would be employed by workmen, engineers and others whose occupations involve time as a material element, it is to be understood that the invention is not limited to such use.

The invention accordingly consists in the features of construction, combinations of elements and arrangement of parts which will be exemplified in the construction hereinafter set forth, and the scope of the application of which will be indicated in the following claims.

Referring now to the accompanying drawings, wherein is illustrated one of several embodiments of my invention, Figure 1 is a front elevation of the recorder; Fig. 2 is a central vertical section thereof; Fig. 3 is a perspective view with the casing broken away to disclose the interior; and Fig. 4 is a view of a card with records thereon.

The numeral 1 indicates a casing adapted to support and house the several parts of the mechanism. The rear wall of the casing supports a preferably horizontal rod or shaft 2, secured thereto in any suitable manner, as by a shoulder 3, and a nut 4. The shaft 2 comprises a reduced portion 5, upon which is journaled a sleeve 6, the latter abutting the shoulder 7, and being thereby properly located with respect to the casing. At its inner portion the sleeve 6 carries a cylindrical platen or elapsed time wheel 8 keyed thereto and preferably vertically arranged, while the outer portion of the sleeve extends outside of the casing, for a purpose hereinafter described. Journaled on the sleeve 6 and freely rotatable with respect thereto is another platen, or time wheel 9, its axis being preferably in line with the axis of the wheel 8. The wheels 8 and 9 are provided on their peripheries with printing characters arranged to indicate intervals of time and time instants, respectively, and these characters are preferably symmetrically arranged around the axis of the wheels and at such a distance from the axis as to register with an opening or printing point 10 in the casing. Above this opening is located a stamp 11, and an inking ribbon 12′ is preferably arranged at this point between the characters and the stamp, so that when a card is introduced beneath the stamp, the characters on the wheel which register with the opening 10 will be printed side by side when the stamp is operated. The periphery of the time wheel 9 is preferably divided into hours and fractions thereof, the distance between each division of the latter in this instance representing a time interval of ten minutes, and the entire periphery comprising twelve hours to correspond with the division of an ordinary clock dial. The time wheel or platen 9 is preferably of hollow cylindrical shape providing an annulus, or annular head 12, which is marked with the hour and minute inscriptions of a clock dial, as clearly shown. For the purposes of this embodiment of the invention, the wheel 9 is rotated at a rate corresponding to the lapse of time, and to effect this a clock movement or time train 13 is employed, though it is evident that any suitable source of properly regulated motive power may be used. The clock movement or time train 13 is secured to a front removable plate 14 and extends within the opening of the time wheel to economize space. The time wheel 9 is provided with an internal toothed gear 15 and the time train has gearing engaging the same so proportioned as to revolve the time wheel once in twelve hours in a direction anti-clockwise. If any fixed point adjacent the face of the time wheel be regarded as an observing point, the time of day is indicated at such point by the rotary clock dial, which is rotated by the time train, the figures thereof being carried past the fixed point in accordance with the lapse of time. To define such observing point, the mark 16 vertically over the axis of the time wheel is provided.

In order that the plate 14 may be efficiently supported, it is provided with a short sleeve 17, shouldered to receive a glass cover 18 through which the face of the apparatus may be observed. The cover 18 is surrounded by a suitable rim 19 of metal or other material designed to closely fit the circular opening in the front wall of the casing. By this construction the cover 18 and the plate 14 are removably but securely and accurately held in position to support the clock movement and to retain the gear 15 in mesh with the time train, while permitting ready removal for inspection or repair of the mechanism. The cover 18 is held on the plate by an annular nut 20.

The sleeve 6 carrying the elapsed time wheel 8, is freely revoluble on the shaft 2, and on the end of said sleeve beyond the cover 18 is fixed an arm comprising an indicator 21, in line with the zero, or blank, division of the elapsed time wheel, one end being weighted as at 22 and serving to yieldingly maintain the pointing end of the indicator at a predetermined position relative to the rotary dial, in this instance elevated and at the observing mark or point 16. The indicator 21 serves to define the angular position of the elapsed time wheel, and the weighted end of the indicator also serves as a handle for its manipulation. The indicator is thus in position to play over the face of the rotary dial to any desired extent. The elapsed time wheel 8 is sub-divided on its periphery into divisions equal to those on the periphery of the time wheel, but the characters indicating the divisions show time intervals or elapsed time, instead of time instants or time of day, as indicated by the time wheel. The numeral 12 is therefore omitted and in its place is zero; or this point may be left blank, if desired.

On the front of the plate 14 is located the fixed dial 23, of an ordinary clock, and the movement of the time train 13 is transmitted to the hands 24 and 25 in the ordinary manner. Preferably the digit XII of the fixed dial is located in line with the observing point 16, and serves also as an observing point.

The opening 10 is preferably located at that point in the casing opposite the observing point 16, and is sufficiently wide to permit the effective operation of the stamp in printing on a card or other suitable device without obtaining impressions from the printing characters ahead or in rear of those at the printing point. The wheels 8 and 9 are arranged as close to each other as comports with their efficient independent operation, so that when the peripheral printing characters are in printing position they form a single line of type, the opening 10 being of sufficient length to uncover the complete line and the stamp 11 being long enough to make an impression from the complete line in a single operation.

The operation of the device is as follows: The clock movement being set to indicate at the observing point the time of day which of course corresponds with the time shown by the fixed dial 23, the wheel 9 will be rotated and the visible clock dial on its face or head will indicate at the observing point the time of day. The peripheral printing characters on the time wheel will also arrive at the printing point at times corresponding to their respective indications, and in case a ribbon does not obscure them, the time of day may be observed from such characters. If the indicator 21 is permitted to rest in normal vertical position, the elapsed time wheel 8 will be held with its zero or blank division at the printing point. With the mechanism in this condition when work is started, a card is placed beneath the stamp and the operation of the stamp will record on the card in one place the time of day, and alongside the same zero or blank will be recorded. This records the time of starting the work, the zero or blank showing that there has been no elapsed time. When the work is finished, the same card is placed in position to receive the impression of the recorder just beneath the printed record, and the indicator 21 is turned back until it points to the time the work was started as shown by the first record. When the indicator is in this latter position the stamp is operated, and on the card will be printed a second record, indicating in one place the time instant at which the work was finished, and alongside the same the interval of time between the time the work was started and the time it was finished, or, in other words, the time it took to do the work. The card will thus contain in one row the time of beginning and ending the work, and in another row the elapsed time.

By forming the time wheel in the shape of a hollow cylinder, or annulus, space is provided to accommodate the motor mechanism.

The annulus is supported on the rotary sleeve by the web, as shown, or light spokes may be employed if desired. In either event the support is preferably located back from the face or head to provide an annular recess to receive the time train. The elapsed time wheel may be shaped similarly to the time wheel, but the annular space to accommodate other parts is not required in this embodiment of the invention. The printing characters on the elapsed time wheel comprise a progressing series adapted to indicate intervals of time, and while in this form of the invention, numerals higher than twelve are unnecessary, it is evident that the series may be as extensive as may be desired for the purpose for which the machine is to be employed.

It will be noted that one function of the time wheel is to indicate definite time instants spaced from each other, and that the indication is not only visual as by the clock dial, but that characters indicating such different or spaced times are printed at such different times, thus providing a permanent record. By means of the wheel 8 the characters indicating the time intervals may be manually set in printing position. The characters indicating the time instants are automatically set in similar position by the clock movement or other motor employed.

The characters on the elapsed time wheel may represent other values than intervals of time, and still be within the purview of this invention. For instance, the money values, which may be selected as functions of the time intervals, may be employed, and the machine will then print the cost of the work done.

By the above described construction, a mechanism is provided which is simple and effective in operation and efficiently accomplishes the objects for which it was designed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:—

1. In an apparatus of the character described, in combination, a horizontal shaft, a vertically arranged wheel secured thereto, and provided with a series of printing numbers comprising zero adapted to indicate intervals of time, and a weighted indicator fixed to the wheel to yieldingly maintain the zero in elevated position.

2. In an apparatus of the character described, in combination, a stamp, independent rotatable platens comprising time printing characters adapted to pass beneath said stamp, one of said platens comprising a visible clock dial, means to rotate the clock dial platen in accordance with the lapse of time, an arm connected to the other platen and comprising an indicator to coöperate with the figures of the dial to show the relative position of the platens.

3. In an apparatus of the character described, in combination, a clock, a movable clock dial surrounding the clock, connections between the clock movement and the movable dial to drive the dial in accordance with the rate of the clock, a wheel having time printing characters corresponding to the figures of the movable dial and connected to move synchronously with said dial.

4. In an apparatus of the character described, in combination, a wheel provided with a series of printing characters around its axis, means adapted to yieldingly hold the wheel in a predetermined position and serving as a handle to move the wheel to set the characters in printing position, and means to print from said characters.

In testimony whereof I affix my signature, in the presence of two witnesses.

HENRY W. BROWN.

Witnesses:
ROBERT S. BLAIR,
LEONARD A. WATSON.

---

Copies of this patent may be obtained for five cents each, by addressing the "Commissioner of Patents, Washington, D. C."